United States Patent
Hees et al.

(10) Patent No.: US 7,074,850 B2
(45) Date of Patent: Jul. 11, 2006

(54) CROSS-LINKABLE POLYURETHANE BLOCK COPOLYMERS AND THEIR USE IN DISPERSION BINDING AGENT SYSTEMS

(75) Inventors: Ulrike Hees, Mannheim (DE); Sophia Ebert, Mainz (DE); Ruediger Sens, Ludwigshafen (DE); Friedrich-Wilhelm Raulfs, Mannheim (DE); Hans-Guenter Bohrmann, Ludwigshafen (DE); Lothar Schulz, Nussloch (DE); Heinz Heissler, Frankenthal (DE); Johann Mueller, Worms (DE); Karl Siemensmeyer, Frankenthal (DE); Guenter Renz, Freinsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 10 days.

(21) Appl. No.: 10/489,865

(22) PCT Filed: Sep. 14, 2002

(86) PCT No.: PCT/EP02/10319

§ 371 (c)(1),
(2), (4) Date: Mar. 24, 2004

(87) PCT Pub. No.: WO03/029318

PCT Pub. Date: Apr. 10, 2003

(65) Prior Publication Data

US 2004/0249088 A1    Dec. 9, 2004

(30) Foreign Application Priority Data

Sep. 26, 2001  (DE) ............................... 101 47 404
Oct. 5, 2001    (DE) ............................... 101 49 268

(51) Int. Cl.
*C08J 3/00*    (2006.01)
*C08K 3/20*    (2006.01)
*C08L 75/00*   (2006.01)
*C08F 283/04*  (2006.01)
*C08G 18/00*   (2006.01)

(52) U.S. Cl. ............ 524/590; 106/31.13; 347/1; 428/423.1; 523/160; 523/161; 524/589; 524/591; 524/839; 524/840; 525/453; 525/454; 528/44; 528/59; 528/60; 528/65; 528/66; 528/80; 528/85

(58) Field of Classification Search ........... 523/160, 523/161; 428/423.1; 106/31.13; 347/1; 524/589, 590, 591, 839, 840; 525/453, 454; 528/44, 59, 60, 65, 66, 67, 71, 80, 83, 84, 528/85

See application file for complete search history.

(56) References Cited

U.S. PATENT DOCUMENTS

| | | | |
|---|---|---|---|
| 4,180,491 A | | 12/1979 | Kim et al. |
| 5,334,690 A | * | 8/1994 | Schafheutle et al. .......... 528/71 |
| 5,594,087 A | | 1/1997 | Konig et al. |
| 5,962,620 A | | 10/1999 | Reich et al. |
| 6,136,890 A | | 10/2000 | Carlson et al. |

FOREIGN PATENT DOCUMENTS

| | | |
|---|---|---|
| EP | 0 739 959 | 10/1996 |
| EP | 0 827 973 | 3/1998 |
| WO | 99 50364 | 10/1999 |
| WO | 00 03081 | 1/2000 |
| WO | 00 17250 | 3/2000 |
| WO | 02 081071 | 10/2002 |

* cited by examiner

Primary Examiner—Patrick D. Niland
(74) Attorney, Agent, or Firm—Oblon, Spivak, McClelland, Maier & Neustadt, P.C.

(57) ABSTRACT

The invention relates to polyurethane block copolymers of general formula (I) to (IV), in which the variables are defined as follows: A represents a polyurethane block, which contains at least one hydrophilic group, B is a hydrophobic polyurethane block, $X^1$, $X^2$ are hydrophilic end groups and n is a whole number from 1 to 20. The invention also relates to the production of cross-linkable dispersion additives from the inventive polyurethane block copolymers and to the use of said cross-linkable dispersion additives for colorant preparations, in particular inks for ink-jet printing.

32 Claims, No Drawings

CROSS-LINKABLE POLYURETHANE BLOCK COPOLYMERS AND THEIR USE IN DISPERSION BINDING AGENT SYSTEMS

The present invention relates to polyurethane block copolymers of the general formulae I to IV

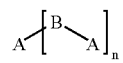

I

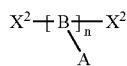

II

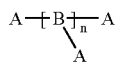

III $$A \!-\!\! \left[B\right]_{\!n}\!\!\!\!\!\begin{array}{c}\\ \diagdown\\ A\end{array}\!\!\!\!A$$

IV where:
A is a polyurethane block containing at least one hydrophilic end group $X^1$,
B is a hydrophobic polyurethane block,
$X^1$ and $X^2$ are each a hydrophilic end group, and
n is an integer from 1 to 20.

The present invention further relates to crosslinkable dispersing binder systems comprising the polyurethane block copolymers of the invention and melamine derivatives, the use of the dispersing binder systems according to the invention for producing colorant preparations and the thus obtainable colorant preparations. The present invention further provides for the use of the colorant preparations according to the invention in aqueous and nonaqueous inks for ink jet printing, aqueous and nonaqueous inks for the ink jet printing process, comprising the colorant preparations according to the invention, and also a process for printing sheetlike substrates by the ink jet process using the inks according to the invention. The present invention lastly provides for the use of the dispersing binder systems according to the invention in waterborne coatings, high solids coating systems, solvent-containing coatings, no solvent or low solvent coatings, no solvent or low solvent paints and nonaqueous inks comprising the dispersing binder systems according to the invention.

Inks for use in the ink jet process (such as Piezo Ink Jet, Continuous Ink Jet, Valve Jet) have to meet a whole series of requirements. They have to have a viscosity and surface tension suitable for printing, they have to be stable in storage, i.e., they should not coagulate or flocculate, and they must not lead to cloggage of the printer nozzle, which can be problematical especially in the case of inks containing dispersed, i.e., undissolved, colorant particles. Stability in storage further requires of these inks that the dispersed colorant particles do not sediment. Furthermore, in the case of Continuous Ink Jet the inks shall be stable to the addition of conducting salts and be free from any tendency to flock out with an increase in the ion content. In addition, the prints obtained have to meet colorists' requirements, i.e., show brilliance and depth of shade, and have good fastness properties, for example, lightfastness, and good drying characteristics.

These requirements can be met by means of suitable dispersing additives. The literature discloses various dispersing additives whose properties have to be further optimized, however.

After a substrate, for example a textile substrate, has been printed, the inks should remain on the substrate and should certainly not be redispersed in a wash liquor used for washing the textile for example. This requires the addition of a binder to the ink or a corresponding treatment of the textile shortly before or after printing, and this requires an additional operation.

WO 00/17250 describes the use of dispersants having a block copolymer structure consisting of a di- or polyfunctional isocyanate and a block which is terminated with a polar group, for example COOH, and whose end group has been reacted with for example polyamides or vinyl-bearing N-containing heterocycles. Inks produced using such dispersants have very good properties with regard to rubfastness and waterfastness, but in the case of prints on textile the level of fixation reveals a need for optimization after several washes. Similarly, fixation decreases substantially in the case of substrates which are bent, folded or creased.

WO 99/41320 describes ink jet printing inks dispersed using polyurethanes having for example dimethylolpropionic acid or polyethylene monomethyl ether as dispersing groups, randomly distributed across the molecule. The inks produced using the inks described are notable for good storage stability and good to moderate printing properties, especially with regard to nozzle failure, but the fixation of the prints is too low for commercial applications.

WO 99/50364 describes the use of polyurethanes as dispersants in ink jet inks comprising a water-soluble solvent, a water-insoluble solvent and water. The polyurethanes contain dispersing, i.e., water-solubilizing, groups randomly distributed across the molecule. However, the fixation of the ink is still capable of improvement.

EP-A 0 739 959 describes random polyurethane copolymers and their use as dispersants.

WO 00/03081 describes a process for printing textile substrates using the ink jet printing process by pretreatment of the substrate with a binder. This process requires an additional operation. It is economically sensible to develop an ink which renders this additional operation unnecessary. However, prior art dispersants are not useful as an ingredient of these inks.

It is an object of the present invention to provide novel dispersing binder systems which overcome the prior art disadvantages and provide a simple process for printing textile substrates. It is a further object of the present invention to use the novel dispersing binder systems to produce inks and to provide a process of production using the novel inks. It is yet a further object of the present invention to print textile substrates using the novel inks, especially by the ink jet process.

Pigment dyeing is a process whereby dyeing liquors containing binder as well as pigment are generally applied to textile substrates by a padding operation with subsequent drying and fixing. The advantage of this operation is the low water consumption, since no further washing operations are needed, which is an ecological advantage. The disadvantage is the inability to provide deep shades if fastness and textile hand are to be satisfactory.

It is a further object of the present invention to provide novel dispersing binders which do not have the disadvantages of the prior art and which make possible a simple process for printing and dyeing textile substrates.

We have found that these objects are achieved by the polyurethane block copolymers defined at the beginning and their use as dispersing binder systems.

The polyurethane block copolymers of the present invention are block copolymers of the general formulae I to IV where:

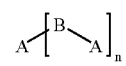
I

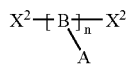
II

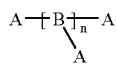
III

A—[B—]$_n$—A
IV

A is a polyurethane block containing at least one hydrophilic end group $X^1$,
B is a hydrophobic polyurethane block,
$X^1$ and $X^2$ are each a hydrophilic end group, and
n is an integer from 1 to 20.

Polyurethanes for the purposes of the present invention are not only polymers which are exclusively linked by urethane groups but in a more general sense polymers which are obtainable by reaction of di- or polyisocyanates with compounds containing active hydrogen atoms. Polyurethanes for the purposes of the present invention, as well as urethane groups, can also contain urea, allophanate, biuret, carbodiimide, amide, ester, ether, uretonimine, uretidione, isocyanurate or oxazolidine groups. An example of a survey is Kunststoffhandbuch/Saechtling, 26th edition, Carl-Hanser-Verlag, Munich 1995, page 491 ff. More particularly, polyurethanes for the purposes of the present invention can contain urea groups. However, polyurethanes for the purposes of the present invention contain at least one urethane group.

Block A has a formula weight $M_n$ from 600 to 30 000 g, preferably up to 10 000 g, more preferably up to 5000 g and most preferably up to 2000 g.

Block B has a formula weight $M_n$ from 600 to 30 000 g, preferably up to 10 000 g, more preferably up to 5000 g and most preferably up to 2000 g.

Hydrophilic end groups $X^2$ in the polyurethane block copolymers of the general formula III according to the invention are identical or different groups selected from:

—OH, O(CH$_2$—CH$_2$—O)$_x$—H, —O(—CHCH$_3$—CH$_2$—O)$_x$—H,
—O(—CH$_2$—CHCH$_3$—O)$_x$—H,
—O(—CH$_2$—CH$_2$—CH$_2$—CH$_2$—O)$_x$—H,
where x is an integer from 1 to 20,
preferably from 1 to 10 and more preferably from 1 to 5;
SO$_3$—, COOH.

Polyurethane block copolymers of the general formulae I, II and IV are preferred. Particular preference is given to polyurethane block copolymers of the general formula I. The construction and synthesis of the polyurethane block copolymers of the present invention could now be illustratively described with reference to compounds of the formula I.

The first step is to prepare blocks A and B in separate operations. To prepare the hydrophobic block B, one or more diisocyanates are reacted by known methods with one or more compounds bearing two isocyanate-reactive groups. The NCO groups of the diisocyanate or diisocyanates can have the same or a different reactivity. Examples of diisocyanates having NCO groups of the same reactivity aromatic or aliphatic diisocyanates, preference being given to aliphatic diisocyanates such as tetramethylene diisocyanate, hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, 1,4-, 1,3- or 1,2-diisocyanatocyclohexane, 4,4'-di(isocyanato-cyclohexyl)methane, 1-isocyanato-3,3,5-trimethyl-5-(isocyanatomethyl)cyclohexane (isophorone diisocyanate) and 2,4- and 2,6-diisocyanato-1-methylcyclohexane, of which hexamethylene diisocyanate and isophorone diisocyanate are particularly preferred. A further particularly preferred diisocyanate is m-tetramethylxylene diisocyanate (TMXDI).

Preferred diisocyanates having NCO groups of differing reactivity are the readily and inexpensively available isocyanates such as for example 2,4-toluylene diisocyanate (2,4-TDI), 2,4'-diphenyl-methane diisocyanate (2,4'-MDI), tri-isocyanatotoluene as representatives of aromatic diisocyanates or aliphatic diisocyanates, such as 2-butyl-2-ethylpentamethylene diisocyanate, 2-isocyanatopropylcyclohexyl isocyanate, 2,4,4- or 2,2,4-trimethylhexamethylene diisocyanate, 2,4'-methylenebis-(cyclohexyl) diisocyanate and 4-methylcyclohexane 1,3-diisocyanate (H-TDI).

Further examples of isocyanates having groups differing in reactivity are 1,3-phenylene diisocyanate, 1,4-phenylene diisocyanate, 1,5-naphthylene diisocyanate, diphenyl diisocyanate, toluidine diisocyanate and 2,6-tolylene diisocyanate.

It will be appreciated that mixtures of two or more of the aforementioned isocyanates can also be used.

It is also possible to replace fractions of the diisocyanate with polyisocyanates, for example triisocyanate or tetraisocyanate, in order that branches may be incorporated into the polyurethane block.

Examples of compounds bearing two isocyanate-reactive groups such as for example OH, SH, NH$_2$ or NHR, where R is selected from C$_1$–C$_{12}$-alkyl, are for example diols and secondary diamines. Preferred examples are secondary diamines, for example 1,4-butylene-N,N'-dimethylamine, and especially linear or branched alkanediols or cycloalkanediols having from 2 to 10 carbon atoms in the alkylene moiety; preferred candidates are in particular: ethylene glycol, 1,2-propanediol, 1,3-propanediol, 1,4-butanediol, 1,6-hexanediol, neopentyl glycol, cis-1,2-cyclohexanedimethanol, trans-1,2-cyclohexanedimethanol and also trans-1,4-cyclohexanedimethanol. It is also possible to use mixtures of the aforementioned compounds. It is further possible to use compounds containing various isocyanate-reactive groups, for example thioglycol or ethanolamine or methyldiethanolamine.

Suitable catalysts to speed especially reaction between the NCO groups of the diisocyanates and the hydroxyl groups and amino groups of the compounds bearing two isocyanate-reactive groups are the well-known tertiary amines, for example triethylamine, dimethylcyclohexylamine, N-methylmorpholine, N,N'-dimethylpiperazine, 2-(dimethylaminoethoxy)ethanol, diazabicyclo(2,2,2)octane and the like and especially organic metal compounds such as titanate esters, iron compounds such as for example iron(III) acetylacetonate, tin compounds, for example tin diacetate, tin dioctoate, tin dilaurate or the dialkyl derivatives of tin dialkyl salts of aliphatic carboxylic acids such as dibutyltin diacetate, dibutyltin dilaurate or the like. The catalysts are customarily used in amounts from 0.0001 to 0.1 part by weight per 100 parts by weight of diol or diamine.

The diisocyanates are used in an excess such that the B block is obtained in such a way that it attains the desired molecular weight while still bearing two NCO groups capable of reaction with compounds bearing active hydrogen atoms.

To prepare compounds of the general formula II or III or IV, a hydrophobic block is prepared with one or—in the case of compounds of the formula IV—n NCO groups.

The synthesis of block B is generally carried out without a solvent or in an aprotic solvent, for example in tetrahydrofuran, diethyl ether, diisopropyl ether, chloroform, dichloromethane, di-n-butyl ether, acetone, N-methylpyrrolidone (NMP), xylene, toluene, methyl ethyl ketone (MEK), methyl isobutyl ketone (MIBK) or 1,4-dioxane. Preferred reaction temperatures are in the range from 10° C. to the boiling point of the solvent used. The reaction is generally carried out under atmospheric pressure, but it may also be carried out in autoclaves at up to 20 bar.

To prepare a hydrophobic block B having n NCO groups, branches are incorporated in the polyurethane chain. This is accomplished by adding one or more triisocyanates such as for example Basonat® HB100 to the diisocyanate. Alternatively, the diol can be mixed with one or more triols or tetraols such as for example glycerol, trimethylolpropane or pentaerythritol.

The above-described hydrophobic block is subsequently linked via the NCO groups to one, two or n hydrophilic polyurethane blocks.

The hydrophilic polyurethane block A is synthesized similarly to the above-described block B, except that the compound which bears two isocyanate-reactive groups is used in excess, so that A is produced as an OH—, SH—, $NH_2$— or NHR-terminated block or as a mixture of OH—, SH—, $NH_2$— or NHR-terminated blocks, where R is selected from $C_1$–$C_{12}$-alkyl or $C_6$–$C_{14}$-aryl.

Useful diisocyanates include the abovementioned diisocyanates, and m-tetramethylxylene diisocyanate (TMXDI) is most preferred.

As well as diisocyanates and diols, the polyurethane block A has incorporated into it hydrophilic end groups $X^1$, at least one per block. The hydrophilic end groups are preferably carboxyl groups, which can be introduced for example by means of dihydroxycarboxylic acids such as dimethylolpropionic acid (DMPA) or citric acid. Another embodiment of the present invention introduces a sulfo-containing diol, for example the Michael adduct of diethanolamine with acryloylaminopropanesulfonic acid. Dimethylolpropionic acid is a most preferred example. It is further possible to incorporate selected diols as additional hydrophilic components: polyethylene glycols having from 2 to 50 ethylene units and a preferred molecular weight $M_n$ in the range from 900 to 2 000 g, polypropylene glycols having from 2 to 20 propylene units, polytetrahydrofuran derivatives having from 2 to 10 tetramethylene units and also polyesterpolyols, preferably polyesterdiols. Polyesterpolyols are saturated polyesters or polyethers with or without ether groups that contain at least two free hydroxyl groups per molecule, and preferably they contain from two to ten and more preferably precisely two free hydroxyl groups per molecule. The average formula weights $M_n$ of the polyesterpolyols range from 250 to 4000 g and preferably from 450 to 2000 g.

Such polyesterpolyols are obtainable for example in conventional manner by esterification of one or more dicarboxylic acids or tricarboxylic acids or mixtures of dicarboxylic acids with tricarboxylic acids with diols or triols. The esterification can be carried out in the absence of a solvent or else by azeotropic esterification in the presence of an entrainer. The starting materials for polyesterpolyols are known to one skilled in the art. Preferred dicarboxylic acids include succinic acid, glutaric acid, adipic acid, sebacic acid, pimelic acid, ortho-phthalic acid or their isomers and hydrogenation products and also esterifiable derivatives thereof, for example anhydrides or dialkyl esters, for example dimethyl esters or diethyl esters. Preferred diols include ethylene glycol, 1,2-propanediol, 1,3-propanediol, 1,4-butanediol, 1,6-hexanediol, neopentylglycol, cis-1,2-cyclohexanedimethanol, trans-1,2-cyclohexanedimethanol, polyglycols of the ethylene glycol and 1,2-propanediol type and also diols having at least one further functional group such as for example dimethylolpropionic acid.

Preferred triols are glycerol and trimethylolpropane.

Useful diols further include polycaprolactonediols and polycaprolactonetriols, the preparation of which is likewise known to one skilled in the art.

Useful polyether polyols include for example reaction products of dihydric and/or higher alcohols with one or more equivalents of ethylene oxide and/or propylene oxide. In the case of ethylene oxide-propylene oxide intercondensation products, the reaction can conveniently be controlled so that predominantly primary hydroxyl groups are obtained in the terminal positions. It is further possible to use polybutylene oxides. The average formula weights $M_n$ of the polyetherpolyols range from 250 to 4000 g and preferably from 450 to 2000 g.

The synthesis of the polyurethane block A is generally carried out without a solvent or in an aprotic solvent, for example in tetrahydrofuran, diethyl ether, diisopropyl ether, chloroform, dichloromethane, di-n-butyl ether, acetone, N-methylpyrrolidone (NMP), xylene, toluene, methyl ethyl ketone (MEK), methyl isobutyl ketone (MIBK) or 1,4-dioxane. Preferred reaction temperatures are in the range from 10° C. to the boiling point of the solvent used. The reaction is generally carried out under atmospheric pressure, but it may also be carried out in autoclaves at up to 20 bar.

The hydrophilic end groups $X^1$ described are absent from the hydrophobic block B. The polyurethane block copolymers of the invention are obtained by reacting the hydrophobic block B with 2 equivalents of block A in the presence of a compound catalyzing urethane formation, for example triethylamine, dimethylcyclohexylamine, N-methylmorpholine, N,N'-dimethylpiperazine, 2-(dimethylaminoethoxy) ethanol, diazabicyclo(2,2,2)octane and the like and also especially organic metal compounds such as titanate esters, iron compounds such as for example iron(III) acetylacetonate, tin compounds, for example tin diacetate, tin dioctoate, tin dilaurate or the dialkyl derivatives of tin dialkyl salts of aliphatic carboxylic acids such as for example dibutyltin diacetate or dibutyltin dilaurate in amounts from 0.0001 to 0.1 part by weight per 100 parts by weight of diol or diamine.

To obtain the polyurethane block copolymers of the general formulae II or III according to the invention, block B is respectively reacted with one or n+1 equivalents of A.

Blocks A and B are generally linked according to the invention by known methods without a solvent or in one of the solvents mentioned above. Preferred reaction temperatures range from 10° C. to the boiling point of the solvent used. The reaction is generally carried out under atmospheric pressure, but reactions in autoclaves at up to 20 bar are also possible.

To further use the polyurethane block copolymers of the general formulae I to IV according to the invention, strongly acidic hydrophilic groups such as carboxyl groups and sulfonic groups are neutralized with bases. Preferably they are neutralized with volatile bases such as for example ammonia or volatile primary, secondary or tertiary amines, for example methylamine, ethylamine, dimethylamine, diethylamine, trimethylamine, triethylamine, isopropylamine, ethyldiisopropylamine, di-n-butylamine, ethanolamine, diethanolamine, triethanolamine, methyldiethanolamine, n-propyldiethanolamine or n-butyldiethanolamine.

The present invention further provides melamine-containing polyurethane block copolymers and also a process for producing same from the above-described crosslinkable polyurethane block copolymers, by mixing the above-described polyurethane block copolymers of the general formulae I to IV with one or more melamine derivatives of the general formula V

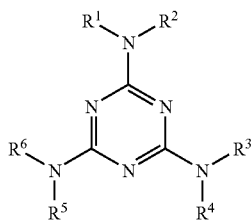

V where $R^1$ to $R^6$ are the same or different and are each selected from:

hydrogen or $CH_2$—$OR^7$, $CH(OR^7)_2$ and $CH_2$—$N(R^7)_2$, where each $R^7$ may be the same or different and is selected from hydrogen, $C_1$–$C_{12}$-alkyl, branched or unbranched, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

alkoxyalkylene selected from (—$CH_2$—$CH_2$—O)$_m$—H, (—$CHCH_3$—$CH_2$—O)$_m$—H, (—$CH_2$—$CHCH_3$—O)$_m$—H, (—$CH_2$—$CH_2$—$CH_2$—$CH_2$—O)$_m$—H, where m is an integer from 1 to 20, preferably from 1 to 10 and more preferably from 1 to 5.

$R^1$, $R^3$ and $R^5$ are preferably different.

Particularly preferably $R^1$ and $R^2$ are both hydrogen and $R^3$ and $R^4$ are both $CH_2$—OH. Most preferably, $R^1$ and $R^2$ are both hydrogen and $R^3$ is $CH_2$—OH.

Melamine derivatives of the general formula V are known per se and are commercially obtainable for example as Luwipal® from BASF Aktiengesellschaft and as Cymel® 327 from Cytec. Melamine derivatives for the purposes of the present invention are generally not pure in accordance with any defined formula; it is usual to observe intermolecular rearrangements of $R^1$ to $R^6$, i.e., transacetalization reactions and transaminalization reactions, and also to some extent condensation reactions and elimination reactions. The formula V indicated above is to be understood as defining the stoichiometric ratios of the substituents and as also encompassing intermolecular rearrangement products and condensation products and elimination products.

The polyurethane block copolymers and melamine derivatives of the general formula V according to the invention are customarily used in a weight ratio in the range from 0.01:1 to 100:1, preferably from 0.1:1 to 50:1 and more preferably from 1:1 to 10:1.

The present invention further provides crosslinkable dispersing binder systems which are obtainable by the above process by mixing the polyurethane block copolymers of the general formulae I to IV and one or more melamine derivatives of the general formula V.

The colorant preparations according to the invention are obtained by intensively mixing the dispersing binder systems according to the invention with one or more sparingly water-soluble colorants, for example in a ball mill. The colorant preparations according to the invention are preferably prepared by not isolating the crosslinkable dispersing binder systems and mixing the synthesized polyurethane block copolymers of the general formulae I to IV with one or more melamine derivatives of the general formula V, water and one or more sparingly water-soluble colorants, for example in a ball mill, at pressures from 1 to 10 bar and from 0 to 250° C. Ball-milled colorant preparations are also known as grinds.

The colorant preparations according to the invention, as well as the crosslinkable polyurethane block copolymers, include water and also finely divided organic or inorganic colorants, i.e., pigments as defined in German standard specification DIN 55944, that are dispersed and substantially insoluble in water and/or in the water-solvent mixture. It will be appreciated that the colorant preparations of the invention may also include colorant mixtures, but preferably only one colorant is present. By way of brightening agents, these pigment preparations may include dyes, especially direct, acid or reactive dyes, that are similar in hue to the pigment.

There now follow examples of useful pigments, vat dyes being included among the organic pigments on account of the overlap with organic pigments.

Organic pigments:

| | |
|---|---|
| monoazo pigments: | C.I. Pigment Brown 25; C.I. Pigment Orange 5, 13, 36 and 67; C.I. Pigment Red 1, 2, 3, 5, 8, 9, 12, |

| | |
|---|---|
| | 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251; C.I. Pigment Yellow 1, 3, 73, 74, 65, 97, 151 and 183; |
| disazo pigments: | C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188; |
| anthanthrone pigments: | C.I. Pigment Red 168 (C.I. Vat Orange 3); |
| anthraquinone pigments: | C.I. Pigment Yellow 147 and 177; C.I. Pigment Violet 31; |
| anthraquinone pigments: | C.I. Pigment Yellow 147 and 177; C.I. Pigment Violet 31; |
| anthrapyrimidine pigments: | C.I. Pigment Yellow 108 (C.I. Vat Yellow 20); |
| quinacridone pigments: | C.I. Pigment Red 122, 202 and 206; C.I. Pigment Violet 19; |
| quinophthalone pigments: | C.I. Pigment Yellow 138; |
| dioxazine pigments: | C.I. Pigment Violet 23 and 37; |
| flavanthrone pigments: | C.I. Pigment Yellow 24 (C.I. Vat Yellow 1); |
| indanthrone pigments: | C.I. Pigment Blue 60 (C.I. Vat Blue 4) and 64 (C.I. Vat Blue 6); |
| isoindoline pigments: | C.I. Pigment Orange 69; C.I. Pigment Red 260; C.I. Pigment Yellow 139 and 185; |
| isoindolinone pigments: | C.I. Pigment Orange 61; C.I. Pigment Red 257 and 260; C.I. Pigment Yellow 109, 110, 173 and 185; |
| isoviolanthrone pigments: | C.I. Pigment Violet 31 (C.I. Vat Violet 1); |
| metal complex pigments: | C.I. Pigment Yellow 117, 150 and 153; C.I. Pigment Green 8; |
| perinone pigments: | C.I. Pigment Orange 43 (C.I. Vat Orange 7); C.I. Pigment Red 194 (C.I. Vat Red 15); |
| perylene pigments: | C.I. Pigment Black 31 and 32; C.I. Pigment Red 123, 149, 178, 179 (C.I. Vat Red 23), 190 (C.I. Vat Red 29) and 224; C.I. Pigment Violet 29; |
| phthalocyanine pigments: | C.I. Pigment Blue 15, 15:1, 15:2, 15:3, 15:4, 15:6 and 16; C.I. Pigment Green 7 and 36; |
| pyranthrone pigments: | C.I. Pigment Orange 51; C.I. Pigment Red 216 (C.I. Vat Orange 4); |
| thioindigo pigments: | C.I. Pigment Red 88 and 181 (C.I. Vat Red 1); C.I. Pigment Violet 38 (C.I. Vat Violet 3); |
| triarylcarbonium pigments: | C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (aniline black); |
| C.I. Pigment Yellow 101 (aldazine yellow); C.I. Pigment Brown 22; | | vat dyes (in addition to those already mentioned above):

C.I. Vat Yellow 2, 3, 4, 5, 9, 10, 12, 22, 26, 33, 37, 46, 48, 49 and 50;
C.I. Vat Orange 1, 2, 5, 9, 11, 13, 15, 19, 26, 29, 30 and 31;
C.I. Vat Red 2, 10, 12, 13, 14, 16, 19, 21, 31, 32, 37, 41, 51, 52 and 61;
C.I. Vat Violet 2, 9, 13, 14, 15, 17 and 21;
C.I. Vat Blue 1 (C.I. Pigment Blue 66), 3, 5, 10, 12, 13, 14, 16, 17, 18, 19, 20, 22, 25, 26, 29, 30, 31, 35, 41, 42, 43, 64, 65, 66, 72 and 74;
C.I. Vat Green 1, 2, 3, 5, 7, 8, 9, 13, 14, 17, 26, 29, 30, 31, 32, 33, 40, 42, 43, 44 and 49;
C.I. Vat Brown 1, 3, 4, 5, 6, 9, 11, 17, 25, 32, 33, 35, 38, 39, 41, 42, 44, 45, 49, 50, 55, 57, 68, 72, 73, 80, 81, 82, 83 and 84;
C.I. Vat Black 1, 2, 7, 8, 9, 13, 14, 16, 19, 20, 22, 25, 27, 28, 29, 30, 31, 32, 34, 36, 56, 57, 58, 63, 64 and 65;

inorganic pigments:

| | |
|---|---|
| white pigments: | titanium dioxide (C.I. Pigment White 6), zinc white, pigment grade zinc oxide; zinc sulfide, lithopone; lead white; |
| black pigments: | iron oxide black (C.I. Pigment Black 11), iron manganese black, spinel black (C.I. Pigment Black 27); carbon black (C.I. Pigment Black 7); |
| color pigments: | chromium oxide, chromium oxide hydrate green; chrome green (C.I. Pigment Green 48); cobalt green (C.I. Pigment Green 50); ultramarine green; cobalt blue (C.I. Pigment Blue 28 and 36); ultramarine blue; iron blue (C.I. Pigment Blue 27); manganese blue; ultramarine violet; cobalt violet and manganese violet; iron oxide red (C.I. Pigment Red 101); cadmium sulfoselenide (C.I. Pigment Red 108); molybdate red (C.I. Pigment Red 104); ultramarine red; iron oxide brown, mixed brown, spinal and corundum phases (C.I. Pigment Brown 24, 29 and 31), chrome orange; iron oxide yellow (C.I. Pigment Yellow 42); nickel titanium yellow (C.I. Pigment Yellow 53; C.I. Pigment Yellow 157 and 164); chrome titanium yellow; cadmium sulfide and cadmium zinc sulfide (C.I. Pigment Yellow 37 and 35); chrome yellow (C.I. Pigment Yellow 34), zinc yellow, alkaline earth metal chromates; Naples yellow; bismuth vanadate (C.I. Pigment Yellow 184); |
| interference pigments: | metallic effect pigments based on coated metal platelets; pearl luster pigments based on mica platelets coated with metal oxide; liquid crystal pigments. |

Preferred pigments in this context are monoazo pigments (especially laked BONS pigments, naphthol AS pigments), disazo pigments (especially diaryl yellow pigments, bisacetoacetanilide pigments, disazopyrazolone pigments), quinacridone pigments, quinophthalone pigments, perinone pigments, phthalocyanine pigments, triarylcarbonium pigments (alkali blue pigments, laked rhodamines, dye salts with complex anions), isoindoline pigments and carbon blacks.

Examples of particularly preferred pigments are specifically: C.I. Pigment Yellow 138, C.I. Pigment Red 122, C.I. Pigment Violet 19, C.I. Pigment Blue 15:3 and 15:4, C.I. Pigment Black 7, C.I. Pigment Orange 5, 38 and 43 and C.I. Pigment Green 7.

These pigments are very useful for preparing ink-jet ink sets based on colorant preparations according to the invention. The level of each pigment in the individual inks shall be conformed to the respective requirements (e.g., trichromism).

The following pigment combinations are particularly recommended:

C.I. Pigment Yellow 138, C.I. Pigment Violet 19, C.I. Pigment Blue 15:3 and C.I. Pigment Black 7;
C.I. Pigment Yellow 138, C.I. Pigment Red 122, C.I. Pigment Blue 15:3 or 15:4 and C.I. Pigment Black 7;
C.I. Pigment Yellow 138, C.I. Pigment Violet 19, C.I. Pigment Blue 15:3, C.I. Pigment Black 7, C.I. Pigment Orange 43 and C.I. Pigment Green 7;
C.I. Pigment Yellow 138, C.I. Pigment Red 122, C.I. Pigment Blue 15:3 or 15:4, C.I. Pigment Black 7, C.I. Pigment Orange 5 and C.I. Pigment Green 7;
C.I. Pigment Yellow 138, C.I. Pigment Red 122, C.I. Pigment Blue 15:3 or 15:4, C.I. Pigment Black 7, C.I. Pigment Orange 38 and C.I. Pigment Green 7;
C.I. Pigment Yellow 138, C.I. Pigment Red 122, C.I. Pigment Blue 15:3 or 15:4, C.I. Pigment Black 7, C.I. Pigment Orange 43 and C.I. Pigment Green 7.

The colorant preparations according to the invention generally include from 0.01 to 20% by weight, preferably from 0.2 to 10% by weight and more preferably from 1 to 6% by weight of pigment, amounts in the range from 1 to 6% by weight being particularly suitable.

The undissolved, dispersed pigments should be very finely divided. Preferably 95% and more preferably 99% of the colorant particles have an average particle diameter of 1 µm, preferably 0.5 µm and more preferably up to 0.2 µm. The average particle diameter is preferably at least 0.05 µm.

Water is the main constituent of the colorant preparations according to the invention, preference being given to demineralized water as obtainable for example through the use of an ion exchanger. The water content is customarily in the range from 30 to 95% by weight. The water content of preparations according to the invention is preferably in the range from 40 to 60% by weight.

The colorant preparations according to the invention generally contain from 0.1 to 40% by weight and preferably from 0.5 to 30% by weight of polyurethane block copolymers according to the invention.

The colorant preparations according to the invention may additionally include one or more organic solvents. Low molecular weight polytetrahydrofuran is a preferred additive, and it can be used alone or preferably mixed with one or more high-boiling water-soluble or -miscible organic solvents.

The preferred polytetrahydrofuran customarily has an average molecular weight $M_w$ of from 150 to 500 g/mol, preferably from 200 to 300 g/mol and more preferably of about 250 g/mol. Polytetrahydrofuran is preparable in known manner by cationic polymerization of tetrahydrofuran. The products are linear polytetramethylene glycols.

Other organic solvents used as an additive are generally high-boiling and hence water-retaining organic solvents that are soluble in or miscible with water. High-boiling solvents have a boiling point>100° C.

Useful solvents include polyhydric alcohols, preferably branched and unbranched polyhydric alcohols containing from 2 to 8 and especially from 3 to 6 carbon atoms, such as ethylene glycol, 1,2-propylene glycol, 1,3-propylene glycol or glycerol.

Useful solvents further include polyethylene glycols and polypropylene glycols (which is also to be understood as meaning the lower polymers (di-, tri- and tetramers)) and their mono (especially $C_1$–$C_6$, in particular $C_1$–$C_4$) alkyl ethers. Preference is given to polyethylene and polypropylene glycols having average molecular weights of from 100 to 1500 g/mol, in particular from 200 to 800 g/mol, mainly from 300 to 500 g/mol. Examples are diethylene glycol, triethylene glycol, tetraethylene glycol, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, di-, tri- and tetra-1,2- and -1,3-propylene glycol and di-, tri- and tetra-1,2- and -1,3-propylene glycol monomethyl, monoethyl, monopropyl and monobutyl ether.

Useful solvents further include pyrrolidone and N-alkylpyrrolidones whose alkyl chain preferably contains from 1 to 4, especially 1 or 2, carbon atoms. Examples of useful alkylpyrrolidones are N-methylpyrrolidone, N-ethylpyrrolidone and N-(2-hydroxyethyl)pyrrolidone.

Examples of particularly preferred solvents are 1,2-propylene glycol, 1,3-propylene glycol, glycerol, sorbitol, diethylene glycol, polyethylene glycol ($M_w$ from 300 to 500 g/mol), diethylene glycol monobutyl ether, triethylene glycol monobutyl ether, pyrrolidone, N-methylpyrrolidone and N-(2-hydroxyethyl)-pyrrolidone.

The polytetrahydrofuran may also be mixed with one or more (e.g., two, three or four) of the abovementioned solvents.

The grinds according to the invention generally include from 0.1 to 40% by weight, preferably from 2.5 to 30% by weight, more preferably from 5 to 25% by weight and most preferably from 10 to 20% by weight of solvent component.

The solvent component, including especially the particularly preferred solvent combinations mentioned, may advantageously be augmented by urea (generally from 0.5 to 3% by weight, based on the weight of the colorant preparation), which further enhances the water-retaining effect of the solvent mixture.

The colorant preparations according to the invention may include further assistants of the type which are customary especially for aqueous ink jet inks and in the printing and coatings industry. Examples of such assistants include preservatives such as for example 1,2-benzisothiazolin-3-one (commercially available as Proxel brands from Avecia Lim.) and its alkali metal salts, glutardialdehyde and/or tetramethylolacetylenediurea.

The present invention further provides for the use of the colorant preparations according to the invention for producing aqueous inks for ink jet printing, a process for producing inks for ink jet printing using the colorant preparations according to the invention and the inks thus produced.

The inks according to the invention are produced by diluting the colorant preparations according to the invention with water. As well as water, further solvents and assistants can be added in the operation.

Water is the main constituent of the inks according to the invention, preference being given to demineralized water as obtainable for example through the use of an ion exchanger. The water content is customarily in the range from 50 to 95% by weight. The water content of inks according to the invention is preferably in the range from 60 to 80% by weight.

The inks according to the invention generally contain from 0.1 to 25% by weight and preferably from 0.5 to 10% by weight of polyurethane block copolymers according to the invention.

The inks according to the invention may include organic solvents as a further component. Low molecular weight polytetrahydrofuran is a preferred additive, and it can be used alone or preferably mixed with one or more high-boiling water-soluble or water-miscible organic solvents.

The preferred polytetrahydrofuran customarily has an average molecular weight $M_w$ of from 150 to 500 g/mol, preferably from 200 to 300 g/mol and more preferably of about 250 g/mol.

When polytetrahydrofuran is present in a mixture with further organic solvents, the invention provides that the solvents used be high-boiling and hence water-retaining solvents that are soluble in or miscible with water. High-boiling solvents have a boiling point>100° C.

Useful solvents include polyhydric alcohols, preferably branched and unbranched polyhydric alcohols containing from 2 to 8 and especially from 3 to 6 carbon atoms, such as ethylene glycol, 1,2-propylene glycol, 1,3-propylene glycol or glyercol.

Useful solvents further include polyethylene glycols and polypropylene glycols (which is also to be understood as meaning the lower polymers (di-, tri- and tetramers)) and their mono (especially $C_1$–$C_6$, in particular $C_1$–$C_4$) alkyl ethers. Preference is given to polyethylene and polypropylene glycols having average molecular weights of from 100 to 1500 g/mol, in particular from 200 to 800 g/mol, mainly from 300 to 500 g/mol. Examples are diethylene glycol, triethylene glycol, tetraethylene glycol, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, di-, tri- and tetra-1,2- and -1,3-propylene glycol and di-, tri- and tetra-1,2- and -1,3-propylene glycol monomethyl, monoethyl, monopropyl and monobutyl ether.

Useful solvents further include pyrrolidone and N-alkylpyrrolidones whose alkyl chain preferably contains from 1 to 4, especially 1 or 2, carbon atoms. Examples of useful alkylpyrrolidones are N-methylpyrrolidone, N-ethylpyrrolidone and N-(2-hydroxyethyl)pyrrolidone.

Examples of particularly preferred solvents are 1,2-propylene glycol, 1,3-propylene glycol, glycerol, sorbitol, diethylene glycol, polyethylene glycol ($M_w$ from 300 to 500 g/mol), diethylene glycol monobutyl ether, triethylene glycol monobutyl ether, pyrrolidone, N-methylpyrrolidone and N-(2-hydroxyethyl)-pyrrolidone.

The polytetrahydrofuran may also be mixed with one or more (e.g., two, three or four) of the abovementioned solvents.

The inks according to the invention generally contain from 0.1 to 40% by weight, preferably from 5 to 30% by weight, more preferably from 10 to 25% by weight and most preferably from 10 to 20% by weight of solvent component.

The solvent components, including especially the aforementioned particularly preferred solvent combinations, may advantageously be supplemented by urea (generally from 0.5 to 3% by weight, based on the weight of the colorant preparation), which further enhances the water-retaining effect of the solvent mixture.

Useful additives further include erythritol, pentaerythritol, pentitols such as arabitol, adonitol and xylitol and hexitols such as sorbitol, mannitol and dulcitol.

The inks according to the invention may include further assistants of the type which are customary especially for aqueous ink jet inks and in the printing and coatings industry. Examples of such assistants include preservatives such as for example 1,2-benzisothiazolin-3-one (commercially available as Proxel brands from Avecia Lim.) and its alkali metal salts, glutardialdehyde and/or tetramethylolacetylenediurea, Protectols®, antioxidants, degassers/defoamers (such as acetylenediols and ethoxylated acetylenediols, which customarily contain from 20 to 40 mol of ethylene oxide per mole of acetylenediol and also have a dispersing effect), viscosity regulators, flow agents, wetters (e.g., wetting surfactants based on ethoxylated or propoxylated fatty or oxo alcohols, propylene oxide/ethylene oxide block copolymers, ethoxylates of oleic acid or alkylphenols, alkylphenol ether sulfates, alkylpolyglycosides, alkyl phosphonates, alkylphenyl phosphonates, alkyl phosphates, alkylphenyl phosphates or preferably polyether siloxane copolymers, especially alkoxylated 2-(3-hydroxypropyl) heptamethyl trisiloxanes, which generally have a block of from 7 to 20 and preferably of from 7 to 12 ethylene oxide units and a block of from 2 to 20 and preferably of from 2 to 10 propylene oxide units and may be present in the colorant preparations in amounts of from 0.05 to 1% by weight), anti-settlers, luster improvers, lubricants, adhesion improvers, anti-skinning agents, delusterants, emulsifiers, stabilizers, water repellents, light control additives, hand improvers, antistats and bases such as triethanolamine or acids, especially carboxylic acids such as lactic acid or citric acid, for regulating the pH. If such assistants are part of the pigment preparations of the invention, their total amount is generally 2% by weight, especially 1% by weight, based on the weight of the colorant preparation.

The inks according to the invention customarily have a dynamic viscosity of from 1 to 20 mPa·s and preferably from 2 to 15 mPa·s, as measured using a rotary viscometer from Haake in accordance with German standard specification DIN 53019-1.

The surface tension of the inks according to the invention is generally in the range from 24 to 70 mN/m and especially in the range from 30 to 60 mN/m, as measured using a K 10 digital tensiometer from Krüss at room temperature. The pH of the colorant preparations according to the invention is generally in the range from 5 to 10 and preferably in the range from 7 to 9, as measured using a 763 pH meter from Knick.

The inks according to the invention have a particularly low kinematic viscosity, especially when compared with inks containing a conventional polymeric binder.

The inks according to the invention may be formulated by mixing one or more polyurethane block copolymers according to the invention with water, with one or more pigments and with one or more melamine derivatives of the general formula V and also with or without additives to form grinds as described above. However, it is possible for the melamine derivative or derivatives not to be added until the dilution with water and thus to the final formulation of the ink.

A further aspect of the present invention is a process for printing sheetlike or three-dimensional substrates by the ink jet process using the inks according to the invention. To this end, the colorant preparations according to the invention are printed onto the substrate.

In the ink jet process, the typically aqueous inks are sprayed as small droplets directly onto the substrate. There is a continuous form of the process, in which the ink is pressed at a uniform rate through a nozzle and the jet is directed onto the substrate by an electric field depending on the pattern to be printed, and there is an interrupted or drop-on-demand process, in which the ink is expelled only where a colored dot is to appear, the latter form of the process employing either a piezoelectric crystal or a heated hollow needle (bubble jet process) to exert pressure on the ink system and so eject an ink droplet. These techniques are described in Text. Chem. Color 19 (1987), No. 8, 23–29, and 21 (1989), No. 6, 27–32.

The inks of the invention are particularly useful as inks for the continuous jet process or the process employing a piezoelectric crystal.

The areas printed by the ink jet process are customarily treated with heat in order that the prints may be fixed and the dispersing binder system may be crosslinked. The heating may be effected using steam or hot air for example. A customary temperature range is from 150 to 180° C. for from 5 to 8 minutes. In the case of hot air, it is advisable to treat the printed textile at from 180 to 200° C. for about one minute.

A further embodiment of the present invention comprises a crosslinking operation initiated thermally or by actinic radiation, preferably in the UV region.

Useful substrate materials include:

- coated or uncoated cellulosics such as paper, paperboard, cardboard, wood and woodbase,
- coated or uncoated metallic materials such as foils, sheets or workpieces composed of aluminum, iron, copper, silver, gold, zinc or alloys thereof,
- coated or uncoated silicatic materials such as glass, porcelain and ceramics,
- polymeric materials of any kind such as polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers such as gelatin,
- textile materials such as fibers, yarns, threads, knits, wovens, nonwovens and garments composed of polyester, modified polyester, polyester blend fabrics, cellulosics such as cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric,
- leather - both natural and artificial - in the form of smooth leather, nappa leather or suede leather,
- comestibles and cosmetics.

The inks according to the invention are notable for advantageous application properties, especially good start-of-print behavior and good sustained use behavior (kogation) and also good drying characteristics. They produce printed images of high quality, i.e., high brilliance and depth of shade and also high rubfastness, lightfastness, waterfastness and wetrubfastness. They are particularly useful for printing coated and uncoated paper and also textile. It is particularly advantageous that the subject process for printing textiles can be performed particularly rapidly and at high throughput per unit time. It was also found that fixation of the print is excellent even after several washes. Similarly, fixation is excellent even in the case of substrates which are singly or repeatedly bent, folded or creased.

The present invention further provides substrates, especially textile substrates, which have been printed by one of the abovementioned processes according to the invention and are notable for particularly crisply printed images or drawings possessing excellent fixation.

The dispersing binder systems according to the invention are also useful in high solids coating systems. The dispersing binder systems according to the invention are further useful in no solvent or low solvent coatings, i.e., coatings containing less than 5% by weight of solvent, and in nonaqueous inks. A further aspect of the present invention is therefore the use of the dispersing binder systems according to the invention in high solids coating systems, in no solvent or low solvent coatings and also in nonaqueous inks. A further aspect of the present invention is high solids coating systems, no solvent or low solvent coatings and nonaqueous inks that contain the dispersing binder systems according to the invention.

The colorant preparations of the invention are very useful in solvent-containing coatings, solvents in this context being nonaqueous solvents, and in waterborne coatings.

A further, very particularly preferred subject matter of the present invention is the use of the dispersing binder systems of the invention as a dispersing binder additive for pigment dyeing and pigment printing.

According to the invention, the above-described grinds are used to prepare a dyeing liquor for pigment dyeing or a print paste for pigment printing, specifically textile pigment printing. The present invention accordingly further provides a process for preparing dyeing liquors for pigment dyeing and for preparing print pastes for pigment printing and also the dyeing liquors and print pastes according to this invention.

The process of this invention comprises mixing the grinds of this invention with the assistants required for the dyeing or printing operation and adjusting the colorant content by diluting with water.

The water used for this purpose need not be completely ion-free. It is customary to use incompletely deionized water or very soft water. If insufficiently soft water is available, it is customary to use complexing agents (water softeners) to control the hardness in the water. Useful water softeners for the pigment dyeing operation generally sequester $Ca^{2+}$ and $Mg^{2+}$ ions. Examples of particularly useful water softeners are nitrilotriacetic acid, ethylenediaminetetraacetic acid, diethylenetriaminepentaacetic acid, hydroxyethylethylenediaminetriacetic acid or methylglycinediacetic acid. The amount of water added to prepare the dyeing liquor depends on the depth of shade to be produced on the textile on the one hand and the amount of dyeing liquor padded onto the textile on the other.

Dyeing liquors according to this invention may further include additives, for example solvents. Useful solvents include the same solvents as are useful for preparing the grinds. Preference is given to concentrations from 0 to 10% by weight, particularly preferably up to 5% by weight.

The dyeing liquors of this invention may further include a wetting agent additive, preferably a wetting agent of the low-foam type, since foaming due to the high turbulence of the dyeing operation impairs the quality of the dyeing by producing unlevelness. Wetting agents used include for example ethoxylated and/or propoxylated products of fatty alcohols or propylene oxide-ethylene oxide block copolymers, ethoxylated or propoxylated fatty or oxo alcohols, also ethoxylates of oleic acid or alkylphenols, alkylphenol ether sulfates, alkylpolyglycosides, alkyl phosphonates, alkylphenyl phosphonates, alkyl phosphates and alkylphenyl phosphates.

Dry woven or loop-formingly knitted textiles as used in continuous pigment dyeing contain a large amount of air. Dyeing here requires the use of deaerators. These are based for example on polyether siloxane copolymers. They can be included in the dyeing liquors of this invention in amounts from 0.01 to 2 g/l.

The dyeing liquors according to this invention may further include one or more hand improvers. These are generally polysiloxanes or waxes (based on polyethylene or polyethylene glycols). Polysiloxanes have the advantage of permanence, whereas waxes are gradually washed off during use.

The dyeing liquors according to this invention customarily have a weakly acidic pH, preferably in the range from 4 to 6.5. The viscosities of the dyeing liquors according to this invention are preferably in the range below 100 mPa·s. The surface tensions of the dyeing liquors according to this invention are to be adjusted so as to enable fabric to be wet. Surface tensions of less than 50 mN/m are widely used.

A further aspect of the present invention is a process for preparing the dyeing liquors according to this invention. The process according to this invention comprises mixing the above-described grinds with the above-recited additives such as further solvents, defoamers, hand improvers, emulsifiers and/or biocides and making up with water at from 0 to 100° C. and customarily at atmospheric pressure. The process customarily comprises the components being stirred in a mixing vessel, the size and shape of which are not critical. The stirring is preferably followed by a clarifying filtration.

A further aspect of the present invention is a process for dyeing textile substrates using the above-described dyeing liquors according to this invention. The process can be carried out in the usual machines. Preference is given to pad-mangles consisting essentially of two nip rolls through which the textile is passed. The liquor sits above the rolls and wets the textile. The nip pressure causes the textile to be squeezed off and ensures a constant add-on.

The actual dyeing step is customarily followed by thermal drying and fixing steps. Preferably, the fabric is dried at from 100 to 110° C. for from 30 seconds to 3 minutes and fixed at from 150° C. to 190° C. for from 30 seconds to 5 minutes. The drying and fixing causes the dispersing binder additives used according to this invention to be crosslinked. Preference is given to a process for pigment dyeing by padding. The printed and dyed substrates are notable for particular brilliance of color coupled with outstanding hand. A further aspect of the present invention accordingly relates to substrates dyed by the above-described process using the dyeing liquors according to this invention.

A further aspect of the present invention is the use of the above-described dispersing binder additives for textile printing. According to this invention, the above-described dispersing binder additives are incorporated into a print paste for this purpose. Advantageously, the textile printing paste according to this invention is prepared from the grinds according to this invention by mixing with customary printing assistants and subsequent adjustment of the colorant content by dilution with water. The print paste is customarily prepared at from 0 to 200° C. and at from 1 to 10 bar.

Useful printing assistants are known, cf. for example *Ullmann's Enyclopädie der technischen Chemie,* 4th Edition, Textildruck, Volume 22, pages 565 ff., Verlag Chemie, Weinheim, Deerfield/Florida, Basle; 1982. Examples of useful printing assistants are thickeners, fixers, hand improvers and emulsifiers.

Natural and synthetic thickeners can be used. Preference is given to the use of synthetic thickeners, for example generally liquid solutions of synthetic polymers in for example white oil or as aqueous solutions. The polymers contain acid groups which are neutralized with ammonia completely or to a certain percentage. The fixing operation releases ammonia, whereby the pH is lowered and the actual fixing starts.

The ready-prepared paste according to this invention may contain from 30 to 70% by weight of white oil. Aqueous thickeners customarily contain up to 25% by weight of polymer. When aqueous formulations of the thickener are to be used, it is customary to add aqueous ammonia. Similarly, the use of granular, solid formulations of the thickener is conceivable in order that pigment prints may be produced with zero emissions.

The pastes according to the invention may include a further fixing agent. The inclusion of fixing agents in print pastes is known per se. Known and highly suitable fixing agents are commercially available under the names Acrafix RF® (from Bayer AG), Helizarin Fixierer S® and Helizarin Fixierer LF® (BASF Aktiengesellschaft) and Tabriprint Fixierer R® (from CHT).

The print pastes according to this invention may further include hand improvers, which are customarily selected from silicones, especially polydimethylsiloxanes, and fatty acid esters. Examples of commercially available hand improvers useful for inclusion in the print pastes according to this invention are Acramin® Weichmacher SI (Bayer AG), Luprimol SIG® and Luprimol CW® (BASF Aktiengesellschaft).

The print pastes according to this invention may further include one or more emulsifiers, especially when the pastes contain thickeners containing white oil and are obtained as an oil-in-water emulsion. Examples of suitable emulsifiers include aryl- or alkyl-substituted polyglycol ethers. Commercially available examples of suitable emulsifiers are Emulgator W® (Bayer), Luprintol PE New® and Luprintol MP® (BASF Aktiengesellschaft) and Solegal W® (Hoechst AG).

Further possible ingredients include Brønsted acids, which are needed particularly in the case of nonaqueous-based pastes. Preference is given to ammonium salts of inorganic acids, for example diammonium hydrogenphosphate.

Pigment printing can be carried out by various processes known per se. It is customary to use a screen through which the print paste is forced with a squeegee. This process belongs to the screen printing processes. The subject pigment printing process utilizing the print pastes according to this invention provides printed substrates combining particularly high brilliance and depth of shade for the prints with excellent hand for the printed substrates. The present invention accordingly also provides substrates printed by the subject process utilizing the subject print pastes. The actual printing step is customarily followed by thermal drying and fixing steps. Preferably, the fabric is dried at from 80 to 110° C. for from 30 seconds to 3 minutes and fixed at from 150° C. to 190° C. for from 30 seconds to 5 minutes. The drying and fixing causes the dispersing binder additive used according to this invention to be crosslinked.

Useful substrate materials include textile materials such as fibers, yarns, threads, knits, wovens, nonwovens and garments composed of polyester, modified polyester, polyester blend fabric, cellulosic materials such as cotton, cotton blend fabric, jute, flax, hemp and ramie, viscose, wool, silk, polyamide, polyamide blend fabric, polyacrylonitrile, triacetate, acetate, polycarbonate, polypropylene, polyvinyl chloride, polyester microfibers and glass fiber fabric.

The examples which follow illustrate the invention.

1. SYNTHESIS EXAMPLES

1.1. SYNTHESIS OF THE A BLOCK 142.86 g of the Lupraphen® VP9327 polyesterdiol from BASF Schwarzheide were dissolved with 18.52 g (0.178 mol) of neopentylglycol, commercially available from Acros Chemicals, 19.26 g of dimethylolpropionic acid (0.144 mol), commercially available from Acros Chemicals, and 107.02 g (0.423 mol) of 4,4'-diphenylmethane diisocyanate (Lupranat® MES from BASF Aktiengesellschaft) in 287.7 g (324 ml) of tetrahydrofuran which has been distilled over sodium and, after addition of 0.05 g of di-n-butyltin dilaurate (Bärostab® DBTL/C from Bärlocher GmbH), heated to 60° C. After isocyanate was no longer detectable by IR spectroscopy, the reaction was ended by cooling.

1.2. SYNTHESIS OF THE B BLOCK 52.0 g (0.483 mol) of neopentylglycol and 178.45 g (0.665 mol) of m-tetramethylxylene diisocyanate (commercially available from Cytec GmbH) were dissolved in 230.45 g (260 ml) of tetrahydrofuran and, after addition of 0.13 g of di-n-butyltin dilaurate, heated to 60° C. until the titrimetrically determined isocyanate content was 4.2% by weight.

The isocyanate was titrimetrically determined by admixing an aliquot of the reaction solution with an excess of di-n-butylamine, so that the unconsumed isocyanate groups fully reacted, and backtitrating the unconverted amine. The method is known to those skilled in the art of polyurethane chemistry.

1.3. CONVERSION TO THE ABA BLOCK COPOLYMER OF THE GENERAL FORMULA I 100 g of the B block solution described under 1.2. were mixed with 800 g of the A block solution described under 1.1. and, after addition of 0.2 g of di-n-butyltin dilaurate, heated to 60° C. When isocyanate was no longer titrimetrically detectable, the dimethylolpropionic acid incorporated in the A block was neutralized by addition of 20.2 g of triethylamine and then 835 ml of water were added. The dispersion thus formed was distilled to remove the tetrahydrofuran.

2. PRODUCTION OF A COLORANT PREPARATION 6.0 g of Pigment Blue 15:4 were ball milled (Dispermat AE 3-C from VAM Getzmann) with 43.27 g of a 41.6% by weight solution of the block copolymer prepared under 1.3. and 4.07 g of the Cymel® 327 melamine derivative from Cytec GmbH and also 3.0 g of 1,2-propylene glycol and 0.03 g of 1,2-benzisothiazolin-3-one (10% by weight in 1,2-propylene glycol) to an average particle size of 189 nm for the pigment (determined by laser diffraction using a Coulter LS 230 from Coulter). The grinding media were then separated off.

3. PRODUCTION OF AN INK FOR THE INK JET PROCESS AND PRINTING OF SUBSTRATES 20 g of the colorant preparation described under 2. were stirred with 6.0 g of polytetrahydrofuran of molar mass 250, commercially available from BASF Aktiengesellschaft;

3.0 g of triethylene glycol n-butyl ether 5.0 g of polyethylene glycol of molar mass 400

6.0 g of glycerol 1.0 g of urea 0.5 g of TegoWet260® surfactant and 0.5 g of 1,2-benzisothiazolin-3-one (10% by weight in 1,2-propylene glycol)

and also 58 ml of water in a glass beaker. This afforded 100 g of an ink. The viscosity was 3.92 mPa·s and the pH was 8.14.

The ink described above was used on a commercially available printer from Epson (Stylus Color 3000) to uniformly print an area 25.5 cm×18 cm in size at a resolution of 720 dpi. The substrates used were paper and paper-laminated cotton. There was no nozzle failure by the time 15 pages had been printed. The printed textile was fixed by storage in a drying cabinet at 150° C. for 5 minutes and was then tested for its performance characteristics:

The use of the gray scale to determine the fastnesses is described in ISO 105 A03 (DIN 54002, rubfastness) and IS0105-A02 (DIN 54001, washfastness).

Rubfastness dry: 3–4

Rubfastness wet: 3

Washfastness: 4

4. PRODUCTION OF A COLORANT PREPARATION 6.0 g of Pigment Yellow 138 were ball milled in a Scandex shaker from Lau with 43.27 g of the aqueous solution of block copolymer prepared under 1.3 and 4.07 g of Cymel® 327 from Cytec GmbH and also 3.0 g of propylene glycol as an organic solvent and 0.03 g of 1,2-benzisothiazolone as a 10% by weight solution in propylene glycol and also 4.68 ml of water to an average particle size of 200 nm for the pigment (determined by laser diffraction using a Coulter LS 230 from Coulter). The grinding media were then separated off. This provided a unitary grind.

5. PRODUCTION OF A DYEING LIQUOR 33 g of the grind described in Example 4 were mixed in a beaker with 3 g of poly-THF 250 (commercially available from BASF Aktiengesellschaft), 1.5 g of triethylene glycol mono-n-butyl ether, 2.5 g of polyethylene glycol having an average molar mass $M_w$ of 400 g, 3 g of glycerol, 0.5 g of urea, 0.5 g of Cymel® 327 melamine resin from Cytec GmbH and also 0.25 g of Tego Wet 260 surfactant and 0.25 g of 1,2-benzisothiazolone as a 10% by weight solution in propylene glycol and made up with water to 100 g. The dyeing liquor thus obtained was clarified by passing it through a filter (having a pore diameter of 1 μm).

6. PIGMENT DYEING WITH DYEING LIQUOR OF INVENTION

The dye liquor obtained in Example 5 was applied to a 67:33 polyester-cotton fabric on an HVF12085 pad-mangle from Mathis. The nip pressure of the rolls was 2.6 bar. The result was a wet pickup of 55%. The application rate was 2 m/min. The textile was then dried at 110° C. in an LTF89534 Mathis circulating air cabinet at 50% recirculation for 60 s. The final fixing took place at 190° C. and 100% recirculation in the course of 30 s.
The following fastnesses were determined:

| Brush wash | 4–5 |
| Rubfastness dry | 4–5 |
| Rubfastness wet | 4 |
| Wash fastness | 4 |

7. PRODUCTION OF A PRINT PASTE 33 g of the grind described in Example 4 were stirred in a beaker with 3 g of poly-THF 250 (commercially available from BASF Aktiengesellschaft), 1.5 g of triethylene glycol mono-n-butyl ether, 2.5 g of polyethylene glycol having an average molar mass $M_w$ of 400 g, 3 g of glycerol, 0.5 g of urea, 0.5 g of Cymel® melamine resin from Cytec GmbH and also 0.25 g of Tego Wet 260 surfactant and 0.25 g of 1,2-benzisothiazolone as a 10% by weight solution in propylene glycol and made up with water to 100 g. This thus obtained pigment paste was admixed with 2.8 g of Lutexal HIT thickener from BASF Aktiengesellschaft by rapid stirring with a high speed stirrer. The print paste thus obtained had a viscosity of 6.5 Pas.

8. PIGMENT PRINTING WITH PRINT PASTE OF INVENTION

The print paste obtained in Example 7 was printed through a 120 mesh screen printing stencil onto a cotton fabric using a roller squeegee 8 mm in diameter and a tension setting of 6. The textile was then dried at 80° C. in an LTF89534 Mathis circulating air cabinet at 50% recirculation for 5 min. The final fixing took place at 150° C. and 100% recirculation in the course of 5 min.
The following fastnesses were determined:

| Rubfastness dry | 4 |
| Rubfastness wet | 3–4 |
| Wash fastness | 4–5 |

Rubfastnesses were determined in accordance with ISO 105 X12 and the wash fastness was determined in accordance with ISO 105 C2.

We claim:

1. A polyurethane block copolymer of the general formulae I to IV

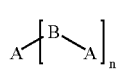

I

II

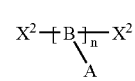

III

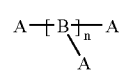

IV where:

A is a polyurethane block containing at least one hydrophilic end group $X^1$ which is terminated by OH, SH, NH2 or NHR, where R is selected from $C_1$–$C_{12}$-alkyl or $C_6$–$C_{14}$-aryl, B is a hydrophobic polyurethane block from which hydrophilic end groups $X^1$ are absent, $X^1$ and $X^2$ are each a hydrophilic end group, $X^1$ being a carboxyl group or being an SO3 group introduced by incorporation of a sulfo-containing diol, each $X^2$ being the same or different and being selected from the group consisting of —OH, $O(CH_2—CH_2—O)_x$—H, —O(—$CHCH_3$—$CH_2$—O$)_x$—H, —O(—$CH_2$—$CHCH_3$—O$)_x$—H, and —O(—$CH_2$—$CH_2$—$CH_2$—$CH_2$—O$)_x$—H, where x is an integer from 1 to 20, and n is an integer from 1 to 20.

2. A polyurethane block copolymer as claimed in claim 1, wherein said blocks A and B each have a formula weight $M_n$ in the range from 600 to 30,000 g.

3. A crosslinkable dispersing binder system, comprising at least one polyurethane block copolymer, as claimed in claim 2.

4. A process for producing a crosslinkable dispersing binder system, which comprises mixing one or more polyurethane block copolymers as claimed in claim 2 with one or more melamine derivatives of the general formula V

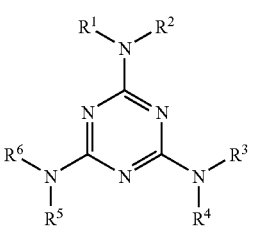

V where:

$R^1$ to $R^6$ are the same or different and are each selected from the group consisting of hydrogen, $CH_2-OR^7$, $CH(OR^7)_2$ and $CH_2-N(R^7)_2$, where each $R^7$ may be the same or different and is selected from the group consisting of hydrogen, branched $C_1-C_{12}$-alkyl, unbranched $C_1-C_{12}$-alkyl, and alkoxyalkylene selected from the group consisting of $(-CH_2-CH_2-O)_m-H$, $(-CHCH_3-CH_2-O)_m-H$, $(-CH_2-CHCH_3-O)_m-H$, and $(-CH_2-CH_2-CH_2-CH_2-O)_m-H$, where m is an integer from 1 to 20.

5. A dispersing binder system obtained by the process of claim 4.

6. A dispersing binder system as claimed in claim 5, wherein $R^1$ and $R^2$ are both hydrogen.

7. A dispersing binder system as claimed in claim 5, wherein $R^3$ is $CH_2OH$.

8. A colorant preparation comprising a dispersing binder system as claimed in claim 3, water and a finely divided inorganic or organic pigment.

9. An ink for the ink jet process, comprising a colorant preparation as claimed in claim 8.

10. The process for printing a sheetlike or three-dimensional substrate by the ink jet process comprising printing with an ink as claimed in claim 9.

11. A sheetlike or and three-dimensional substrate obtained by the process of claim 10.

12. A high solids coating, which comprises:
the dispersing binder system as claimed in claim 5.

13. A high solids coating system comprising the dispersing binder system as claimed in claim 5.

14. The method of preparing a coating, which comprises adding a solvent to the colorant preparation of claim 8.

15. A solvent containing coating comprising a colorant preparation as claimed in claim 8 admixed with a solvent.

16. A composition selected from the group consisting of a solvent or low solvent coating composition or no solvent or low solvent paint comprising the dispersing binder system of claim 5.

17. The preparation of a waterborne coating comprising admixing the colorant preparation of claim 8 with water.

18. A waterborn coating comprising a colorant preparation as claimed in claim 8.

19. The method which comprises preparing a non-aqueous ink by admixing the dispersing binder system of claim 5 with a nonaqueous solvent.

20. A nonaqueous ink comprising the dispersing binder system as claimed in claim 5.

21. The preparation of a pigment dyeing or printing composition comprising admixing the crosslinkable dispersing binder system as claimed in claim 5 with a pigment as a dispersing binder for said pigment dyeing and pigment printing.

22. The process of claim 21, wherein said blocks A and B in said polyurethane block copolymers each have a formula weight $M_n$ in the range from 600 to 10,000 g.

23. Pigment dyeing liquors containing a pigment and a dispersing binder additive prepared as set forth in claim 21.

24. A process for preparing a pigment dyeing liquor as claimed in claim 23, which comprises stirring up with each other followed by clarification of grinds comprising a finely divided pigment and a dispersing binder additive, and water and optionally also one or more ingredients selected from the group consisting of solvents, defoamers, hand improvers and biocides.

25. The process for dyeing a substrate comprising dyeing with a pigment dyeing composition containing a dispersing binder additive prepared as set forth in claim 21.

26. A substrate dyed by a process as claimed in claim 25.

27. A pigment printing paste containing a dispersing binder additive prepared as set forth in claim 21.

28. A process for preparing a pigment printing paste as claimed in claim 27, which comprises stirring up with each other grinds comprising a finely divided pigment and a dispersing binder additive, and water and optionally also one or more ingredients selected from thickeners, fixatives, hand improvers, emulsifiers and Brønsted acids.

29. The process for printing a substrate comprising printing with a pigment printing composition containing a dispersing binder additive prepared as set forth in claim 21.

30. A substrate printed by a process as claimed in claim 29.

31. The process for dyeing a substrate comprising dyeing with pigment dyeing liquor containing a dispersing binder additive as set forth in claim 23.

32. The polyurethane block copolymer of claim 2, wherein block A is a polyester diol, neopentyl glycol, dimethylolpropionic acid, diphenylmethane diisocyanate reaction product polyurethane and block B is a neopentyl glycol-tetramethylxylene diisocyanate reaction product polyurethane.

* * * * *